Patented May 29, 1928.

1,671,513

UNITED STATES PATENT OFFICE.

MAURICE CUSIN, OF DECINES, AND PIERRE ALPHONSE ANDRÉ CHEVALET, OF LUX, FRANCE; SAID CUSIN ASSIGNOR TO SOCIÉTÉ LYONNAISE DE SOIE ARTIFICIELLE, OF LYON, FRANCE, A FRENCH COMPANY.

PROCESS OF PREPARATION OF A MODIFIED CELLULOSE INTENDED TO BE EMPLOYED FOR THE MANUFACTURE OF CELLULOSE ACETATES.

No Drawing. Application filed January 7, 1927, Serial No. 159,737, and in France January 11, 1926.

The preparation of acetates of cellulose by the action of acetic anhydride and of a catalyzer is made much easier when, instead of ordinary cellulose, celluloses modified by acids and known as hydrocelluloses are employed.

On the other hand these hydrocelluloses produce, in general, acetates of cellulose having inferior plastic qualities because the original molecule of cellulose is too depolymerized, particularly if this cellulose has been submitted to violent reactions with elevation of the temperature. The acetates thus obtained are but slightly viscous and contain portions which are soluble in acetone diluted with 40% of water.

To obtain acetates of cellulose having the maximum plastic qualities, it has been considered:

(1) That the various treatments of cellulose, either for the preparation of hydrocellulose or for the acetylation, should be carried out at a temperature as reduced as possible and preferably in the cold state in order to prevent depolymerizing the molecule of cellulose.

(2) That the reagents employed either for hydrolyzing the cellulose or for activating the acetylation should not be violent and should be employed in small proportions to prevent the disintegration of the cellulose and the formation of secondary products.

The reagents generally employed, such as sulphuric acid in large proportion, chlorine, iodine, bromine, chloride of bromine, chlorosulphuric acid, the halogen derivatives of phosphorus, etc. ... give acetates of cellulose which always contain a small quantity of disintegrated products having no plastic quality. Sulphuric acid also gives birth to sulpho-acetates of cellulose which it is necessary to destroy for example by boiling water; consequently these acetates cannot be employed directly by starting from their original solutions to obtain, by direct coagulation in water, threads or pellicles, since the presence of sulpho-acetates renders them unstable.

The present invention has for its object the preparation in the cold state and even at low temperature of a particularly active modified cellulose.

This modified cellulose is obtained by immersion of the cellulose in a bath of commercial formic acid of 80-90% strength, to which is added 10 to 15% of sulphuric acid at 66° Bé., such bath being kept cold or at low temperature. The treatment lasts for a time which varies from two to three hours according to the nature of the cellulose employed.

The cellulose is then removed from the bath, the formic acid is squeezed out and the product is then washed and dried.

Example: A cotton cellulose is steeped at a temperature of 15° C. in the following bath:

| | Litres. |
|---|---|
| 80% formic acid | 100 |
| Sulphuric acid at 66° Bé | 15 |

The duration of immersion is two hours; the modified cellulose is then withdrawn from the bath, the liquid is expelled and the cellulose is then washed and dried.

The same result may be obtained by employing a bath obtained by the action of sulphuric acid on sodium formate.

The cellulose modified by this process has the same appearance as the initial cellulose, the fibre is equally strong.

This modified cellulose has the property of being esterified with the greatest facility by the usual acetylant bath (acetic anhydride and crystallizable acetic acid) in the presence of a trace of sulphuric acid.

The acetylation is effected cold or at low temperature.

By reason of the very small quantity of sulphuric acid which is sufficient for catalyzing the reaction, only insignificant traces of sulphoacetates of cellulose are formed, contrary to that which occurs when other processes are employed.

The invention claimed is not limited either to the quantities or to the operating method herein described as examples, and which can be varied according to the nature of the cellulose employed.

What we claim is:

1. A process of preparing a modified cellulose for use in the manufacture of cellulose acetates, comprising the step of immersing cellulose in a bath of formic acid of 80-90% strength to which concentrated sulphuric acid has been added.

2. A process of preparing a modified cellulose for use in the manufacture of cellulose acetates, comprising the step of treating cellulose with a mixture of diluted formic acid and concentrated sulphuric acid.

3. A process of preparing a modified cellulose for use in the manufacture of cellulose acetates, comprising the step of treating cellulose with a mixture of diluted formic acid and concentrated sulphuric acid in the cold state.

4. A process of preparing a modified cellulose for use in the manufacture of cellulose acetates, comprising the step of treating cellulose with a mixture of 80% formic acid and concentrated sulphuric acid at low temperature.

5. A process of preparing a modified cellulose for use in the manufacture of cellulose acetates, comprising the step of immersing cellulose in a bath of 80% formic acid to which 10–15% of concentrated sulphuric acid has been added.

6. A process of preparing a modified cellulose for use in the manufacture of cellulose acetates, comprising the step of immersing cellulose in a bath of 80% formic acid to which 10–15% of concentrated sulphuric acid has been added, at low temperature.

In testimony whereof we affix our signatures.

MAURICE CUSIN.
PIERRE ALPHONSE ANDRÉ CHEVALET.